United States Patent
Cho

(10) Patent No.: US 11,505,979 B2
(45) Date of Patent: Nov. 22, 2022

(54) PNEUMATIC PRESSURE CONTROL DEVICE AND PNEUMATIC PRESSURE CONTROL METHOD FOR AUTOMATIC DOOR

(71) Applicant: DN Solutions Co., Ltd., Changwon-si (KR)

(72) Inventor: Young-Jeon Cho, Changwon-si (KR)

(73) Assignee: DN SOLUTIONS CO., LTD., Changwon-si (KR)

(*) Notice: Subject to any disclaimer, the term of this patent is extended or adjusted under 35 U.S.C. 154(b) by 736 days.

(21) Appl. No.: 16/494,795

(22) PCT Filed: Feb. 26, 2018

(86) PCT No.: PCT/KR2018/002331
§ 371 (c)(1),
(2) Date: Sep. 17, 2019

(87) PCT Pub. No.: WO2018/169229
PCT Pub. Date: Sep. 20, 2018

(65) Prior Publication Data
US 2020/0095820 A1    Mar. 26, 2020

(30) Foreign Application Priority Data

Mar. 17, 2017  (KR) .................. 10-2017-0033607

(51) Int. Cl.
*E05F 15/56*     (2015.01)
*F15B 11/044*    (2006.01)
(Continued)

(52) U.S. Cl.
CPC ............ *E05F 15/56* (2015.01); *F15B 11/044* (2013.01); *B23Q 11/0825* (2013.01);
(Continued)

(58) Field of Classification Search
CPC ...... F15B 11/044; F15B 11/046; F15B 11/048; F15B 20/00; F15B 2211/40507; F15B 2211/40515; F15B 2211/41554
(Continued)

(56) References Cited

U.S. PATENT DOCUMENTS 10,760,318 B2 * 9/2020 Fortmann ............ F15B 20/004
2018/0313370 A1 * 11/2018 Green .................. F15B 11/044

FOREIGN PATENT DOCUMENTS

DE   2908583 A1    9/1980
EP   2278105 A2 *  1/2011 .............. E05F 15/49
(Continued)

OTHER PUBLICATIONS

International Search Report dated May 24, 2018 for corresponding international application No. PCT/KR2018/002331, with English Abstract.
(Continued)

*Primary Examiner* — Michael Leslie
(74) *Attorney, Agent, or Firm* — STIP Law Group, LLC

(57) ABSTRACT

A pneumatic control device of auto door includes a first directional control valve configured to control a direction of a compressed air supplied to a door cylinder for opening and closing a door, a door detection sensor configured to detect an open/close state of the door, first and second exhaust lines respectively connected to first and second outlet ports of the first directional control valve, and second directional control valves installed in the first and second exhaust lines respectively to operably exhaust the compressed air exhausted from the first and second outlet ports according to an emergency stop signal, and capable of changing positions to
(Continued)

reduce an exhaust speed of the compressed air in case that the door is not completely open or closed when an operation signal is generated after the emergency stop signal.

15 Claims, 13 Drawing Sheets

(51) Int. Cl.
    *B23Q 11/08*     (2006.01)
    *F15B 20/00*     (2006.01)

(52) U.S. Cl.
    CPC ..... *E05Y 2201/41* (2013.01); *E05Y 2201/422* (2013.01); *E05Y 2400/36* (2013.01); *E05Y 2800/252* (2013.01); *F15B 20/00* (2013.01); *F15B 2211/40507* (2013.01); *F15B 2211/40515* (2013.01); *F15B 2211/40592* (2013.01); *F15B 2211/41554* (2013.01); *F15B 2211/455* (2013.01); *F15B 2211/46* (2013.01); *F15B 2211/8606* (2013.01)

(58) Field of Classification Search
    USPC .......................................................... 91/454
    See application file for complete search history.

(56) References Cited

FOREIGN PATENT DOCUMENTS

| | | | |
|---|---|---|---|
| JP | 11-138384 | A | 5/1999 |
| JP | 6655332 | B2 * | 2/2020 |
| KR | 20-0135071 | Y1 | 3/1999 |
| KR | 101000899 | B1 | 12/2010 |
| KR | 10-1245982 | B1 | 3/2013 |
| KR | 10-2013-0085684 | A | 7/2013 |
| KR | 20130085684 | A | 7/2013 |
| KR | 10-2015-0102772 | A | 9/2015 |
| KR | 20150102772 | A | 9/2015 |

OTHER PUBLICATIONS

The Extended European Search Report of EP 18 76 8373, dated Dec. 1, 2020.

* cited by examiner

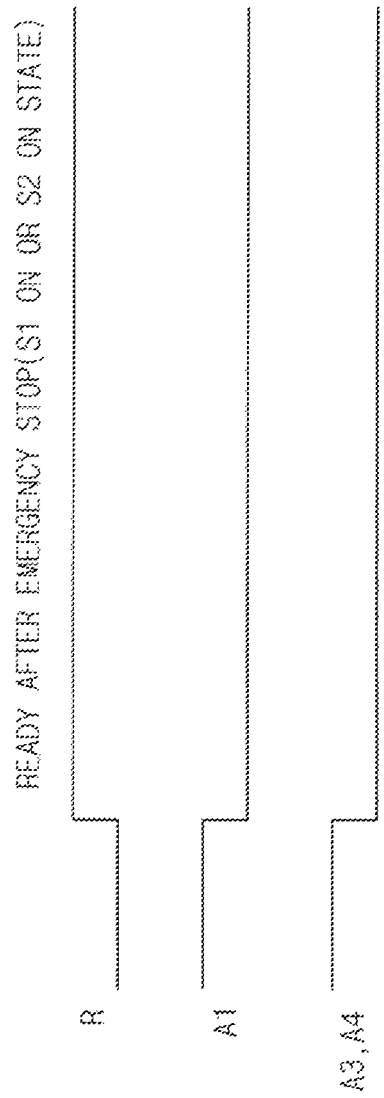

PNEUMATIC PRESSURE CONTROL DEVICE AND PNEUMATIC PRESSURE CONTROL METHOD FOR AUTOMATIC DOOR

CROSS-REFERENCE TO RELATED APPLICATION

The present application is a national stage filing under 35 U.S.C § 371 of PCT application number PCT/KR2018/002331 filed on Feb. 26, 2018 which is based upon and claims the benefit of priority to Korean Patent Application No. 10-2017-0033607 filed on Mar. 17, 2017, in the Korean Intellectual Property Office, which is incorporated herein in its entirety by reference.

TECHNICAL FIELD

The present invention relates to a pneumatic control device and a pneumatic control method of auto door. More particularly, the present invention relates to a pneumatic control device to automatically a door of a machine tool and a pneumatic control method using the same.

BACKGROUND ART

Generally, workpieces and tools may be carried into or taken out of a machine tool through a door. In a pneumatic circuit diagram of auto door for automatically opening and closing the door, an amount of a compressed air supplied to a door cylinder for opening and closing the door from a pneumatic source may be adjusted. However, when a normal operation restarts right after an emergency stop, sudden acceleration of the door may be generated thereby deteriorating controllability.

DISCLOSURE OF THE INVENTION

Problems to be Solved

An object of the present invention provides a pneumatic control device of auto door capable of preventing sudden acceleration after an emergency stop.

Another object of the present invention provides a pneumatic control method of controlling an auto door using the pneumatic control device.

Means to Solve the Problems

According to example embodiments, a pneumatic control device of auto door includes a first directional control valve configured to control a direction of a compressed air supplied to a door cylinder for opening and closing a door, a door detection sensor configured to detect an open/close state of the door, first and second exhaust lines respectively connected to first and second outlet ports of the first directional control valve, and second directional control valves installed in the first and second exhaust lines respectively to operably exhaust the compressed air exhausted from the first and second outlet ports according to an emergency stop signal, and capable of changing positions to reduce an exhaust speed of the compressed air in case that the door is not completely open or closed when an operation signal is generated after the emergency stop signal.

In example embodiments, the pneumatic control device of auto door may further include first and second lines respectively connected to first and second working ports of the second directional control valve, and a deceleration valve installed in any one of the first and second lines.

In example embodiments, the deceleration valve may include a variable orifice.

In example embodiments, each of the second directional control valves may be operable to maintain the exhaust speed of the compressed air in case that the door is completely open or closed when the operation signal is generated after the emergency stop signal.

In example embodiments, the pneumatic control device of auto door may further include an emergency stop selection portion for generating an emergency stop signal, an operation initiating selection portion for generating an operation signal which restarts an operation of the door after the emergency stop signal, and a controller receiving signals from the emergency stop selection portion, the operation initiating selection portion and the door detection sensor and outputting control signals to the first directional control valve and the second direction control valves.

In example embodiments, when the controller receives the emergency stop signal, the controller may control that the first directional control valve is switched to be a neutral position.

In example embodiments, when the controller receives the operation signal, the controller may output the control signal before the emergency stop signal to the first directional control valve.

In example embodiments, the controller may output the control signal for reducing the exhaust speed of the compressed air to the second directional control valve by lapse of a predetermined time after outputting the control signal for opening and closing the door to the first directional control valve.

In example embodiments, the pneumatic control device of auto door may further include an opening/closing valve installed in a supply line which connects a pneumatic source and the first directional control valve to open and close the supply line.

In example embodiments, the pneumatic control device may further include an orifice installed valve in a bypass line which bypasses the opening/closing valve.

In example embodiments, the first and second directional control valves may include a pilot operated solenoid control valve.

In example embodiments, the first directional control valve may include 5 port 3 position direction control valve.

According to example embodiments, in a pneumatic control method of auto door, second directional control valves are installed respectively in first and second exhaust lines respectively connected to first and second outlet ports of a first directional control valve. A compressed air is supplied to a door cylinder through the first directional control valve. An open/close state of the door is detected. The compressed air is exhausted from the first and second outlet ports through the second directional control valves according to an emergency stop signal. The second directional control valve is switched to reduce an exhaust speed of the compressed air in case that the door is not completely open or closed when an operation signal is generated after the emergency stop signal.

In example embodiments, the pneumatic control method may further include making no changes in positions of the second directional control valve to maintain the exhaust speed of the compressed air in case that the door is completely open or closed when the operation signal is generated after the emergency stop signal.

In example embodiments, the pneumatic control method may further switching the first directional control valve to a switched position before the emergency stop signal.

Effects of the Invention

According to example embodiments, a pneumatic control device of auto door, includes a first directional control valve configured to control a direction of a compressed air supplied to a door cylinder for opening and closing a door, and second directional control valves installed in first and second exhaust lines respectively connected to first and second outlet ports of the first directional control valve.

The compressed air may be exhausted from the first and second outlet ports through the second directional control valves according to an emergency stop signal, and in case that the door is not completely open or closed when an operation signal is generated after the emergency stop signal, the second directional control valve is switched to reduce an exhaust speed of the compressed air.

Accordingly, when a system is restarted after the emergency stop, sudden acceleration of the door may be prevented.

However, the effect of the invention may not be limited thereto, and may be expanded without being deviated from the concept and the scope of the present invention.

BRIEF DESCRIPTION OF THE DRAWINGS

FIG. 13 is graphs illustrating signals inputted/outputted to/from the controller in the step of FIG. 12.

BEST MODE FOR CARRYING OUT THE INVENTION

Figure 1:
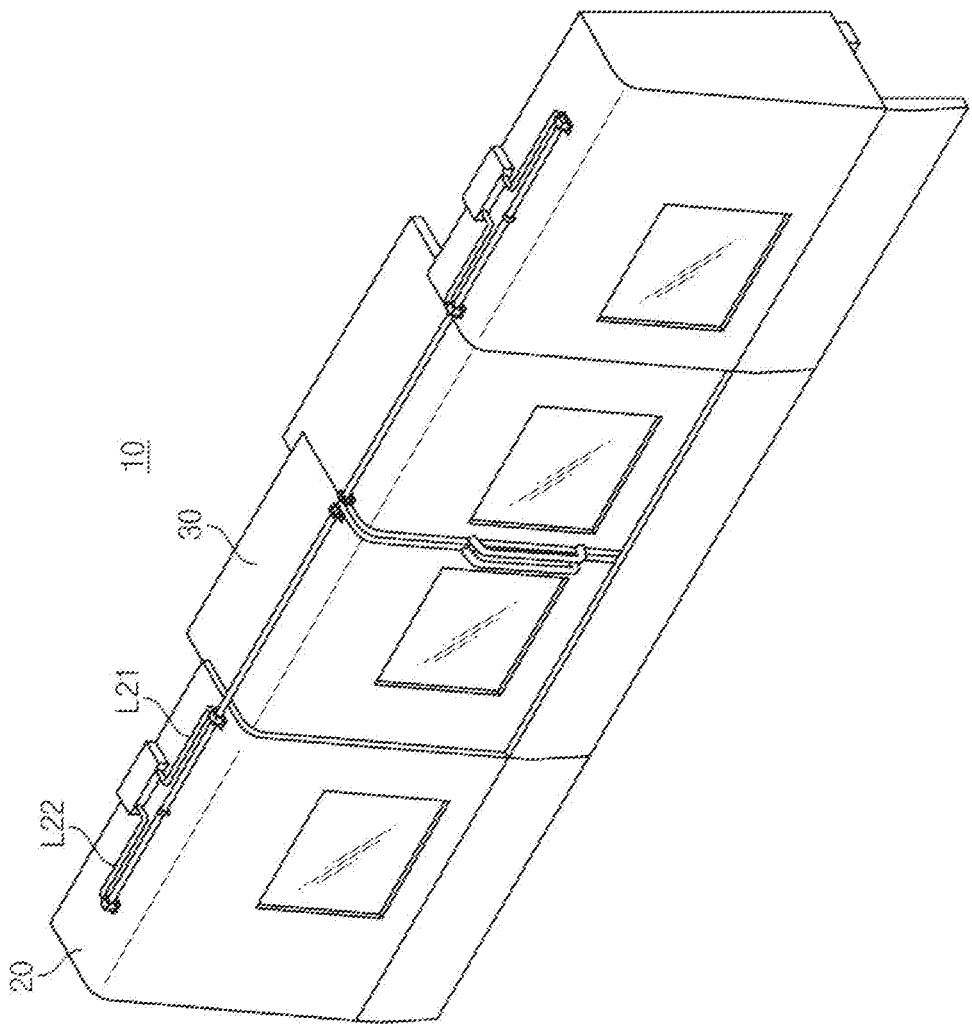
FIG. 1 is a perspective view illustrating a machine tool having an auto door in accordance with example embodiments.

Hereinafter, preferable embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

Figure 2:
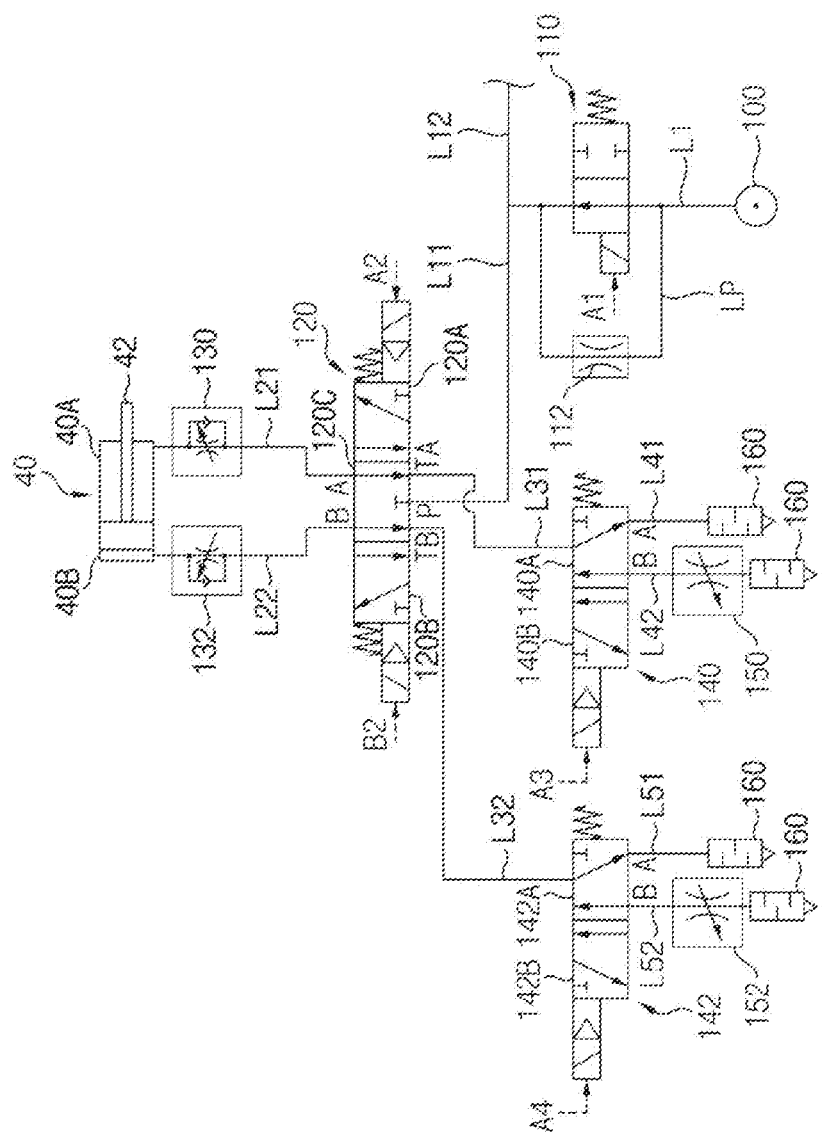
FIG. 2 is a pneumatic circuit diagram illustrating a pneumatic control device of the auto door in FIG. 1.
Figure 3:
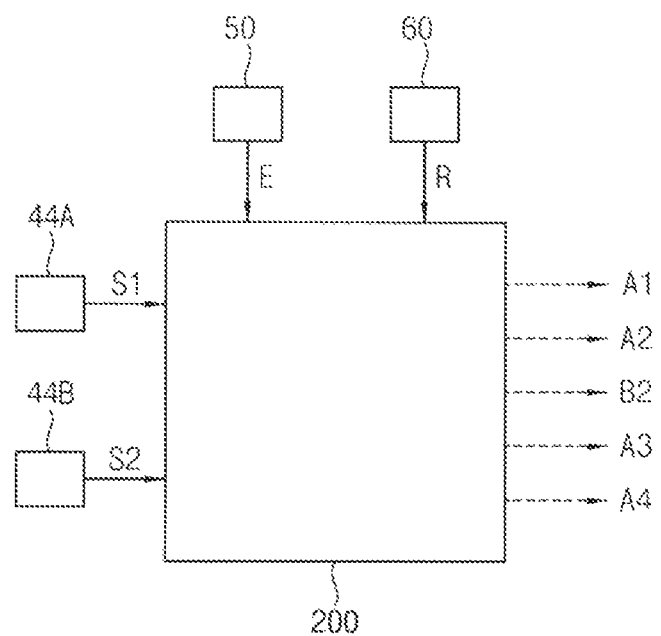
FIG. 3 is a block diagram illustrating the pneumatic control device in FIG. 2.

FIG. 1 is a perspective view illustrating a machine tool having an auto door in accordance with example embodiments. FIG. 2 is a pneumatic circuit diagram illustrating a pneumatic control device of the auto door in FIG. 1. FIG. 3 is a block diagram illustrating the pneumatic control device in FIG. 2.

Referring to FIGS. 1 to 3, a machine tool 10 may include a door 30 installed slidably in a side of a cover body 20 and a pneumatic control device configured to automatically open the door 30.

In example embodiments, the machine tool 10 may include a machine tool main body such as turning center, machining center, etc. within the cover body 20. The door 30, for example, may be installed to be movable along a guide rail. A pair of the doors 30 may be arranged to face each other. It may be understood that the number of the doors may not be limited thereto. Operations and control methods of the doors may be similar to each other, and thus, a method of controlling one door will be explained.

The door 30 may be connected to an operation rod 42 of a door cylinder 40, and the door 30 may perform an opening and closing operations by a reciprocating motion of the operation rod 42 of the door cylinder 40. The door cylinder 40 may include a rod side chamber 40A and a head side chamber 40B. For example, as a compressed air is supplied to the rod side chamber 40A, the operation rod 42 may move back, and as the compressed air is supplied to the head side chamber 40B, the operation rod 42 may move forth. When the operation rod 42 moves back, the door 30 may be opened, and when the operation rod 42 moves forth, the door 30 may be closed.

The pneumatic control device may include a pneumatic source 100 for generating pneumatic pressure, a first directional control valve 120 for controlling a direction of the compressed air supplied to the door cylinder 40, a door detection sensor 44A, 44B for detecting an open/close state of the door 30, first and second exhaust lines L31, L32 respectively connected to first and second outlet ports TA, TB of the first directional control valve 120, and second directional control valves 140, 142 installed in the first and second exhaust lines L31, L32 respectively.

In addition, the pneumatic control valve may further include a first line L41, L51 and a second line L42, L52 respectively connected to first and second working ports A, B of each of the second directional control valves 140, 142, and a deceleration valve 150, 152 installed in any one of the first and second lines.

Further, the pneumatic control valve may further include an emergency stop selection portion 50 for generating an emergency stop signal, an operation initiating selection portion 60 for generating an operation initiating signal which restarts an operation of the door 30 after the emergency stop signal, and a controller 200 for controlling the first direction control valve 120 and the second directional control valves 140, 142.

The pneumatic source 100 such as a compressor may generate the compressed air. The pneumatic source 100 may be connected to the first directional control valve 120 through a main supply line L1 and a first supply line L11. Although it is not illustrated in the drawings, a filter, a pressure adjusting valve, etc. may be installed in the main supply line L1 connected to the pneumatic source 100.

In example embodiments, the pneumatic control device may further include an opening/closing valve 110 installed in the main supply line L1, which connects the pneumatic source 100 and the first directional control valve 120, to open and close the main supply line L1. Additionally, the pneumatic control device may further include a flow control valve in a bypass line LP which bypasses the opening/closing valve 110.

For example, the opening/closing valve 110 may include a solenoid valve. The opening/closing valve 110 may be controlled by ON/OFF control signal A1. The opening/closing valve 110 may be a normally closed valve. Accordingly, when the control signal A1 is applied to the opening/closing valve 110, the opening/closing valve 110 may be switched to an open position.

Additionally, the flow control valve may include an orifice. Accordingly, an amount of the compressed air passing though the bypass line LP may be reduced. When the control signal A1 is not applied, the opening/closing valve 110 may be in a closed position, and a relatively small amount of the compressed air from the pneumatic source 110 may be supplied through the bypass line LP.

The first directional control valve 120 may be connected to the door cylinder 40 through a rod side line L21 and a head side line L22. The rod side line L21 may be connected to the rod side chamber 40A of the door cylinder 40 and the head side line L22 may be connected to the head side chamber 40B of the door cylinder 40. Additionally, flow control valves 130, 132 may be installed in the rod side line L21 and the head side line L22 respectively.

For example, the first directional control valve may include 5 port 3 position direction control valve. The first directional control valve may include a pilot operated solenoid control valve. The rod side line L21 may be connected to a first working port A of the first directional control valve 120 and the head side line L22 may be connected to the second working port B of the first directional control valve 120.

When a door opening control signal A2 is applied to the first directional control valve 120, the first directional control valve 120 may be switched to a first position (door open position) 120A. When a door closing control signal B2 is applied to the first directional control valve 120, the first directional control valve 120 may be switched to a second position (door closed position) 120B. When a door neutral control signal is applied to the first directional control valve 120, the first directional control valve 120 may be switched to a third position (door neutral position) 120C.

The compressed air which drives the door cylinder 40 may be exhausted through the second directional control valves 140, 142 installed in the first and second exhaust lines L31, L32 connected to the outlet ports of the first directional control valve 120 respectively.

The first exhaust line L31 may be connected to a first outlet port TA of the first directional control valve 120 and the second exhaust line L32 may be connected to a second outlet portion TB of the first directional control valve 120. The second directional control valve 140 may be installed in the first exhaust line L31, and the second directional control valve 142 may be installed in the second exhaust line L32.

For example, the second directional control valves 140, 142 may include 2 position direction control valve. The second directional control valves 140, 142 may be a pilot operated solenoid control valve. The second directional control valves 140, 142 may be a normally open valve.

In example embodiments, the first line L41 may be connected to the first working port A of the second directional control valve 140 and the second line L42 may be connected to the second working port B of the second directional control valve 140. The deceleration valve 150 may be installed in the second line L42 to reduce speed of the compressed air exhausted through the second line L42. Additionally, the first line L51 may be connected to the first working port A of the second directional control valve 142 and the second line L52 may be connected to the second working port B of the second directional control valve 142. The deceleration valve 152 may be installed in the second line L52 to reduce speed of the compressed air exhausted through the second line L42. Further, a sound absorber 160 may be installed in each of the first line L41, L51 and the second line L42, L52.

For example, the deceleration valves 150, 152 may include a flow control valve. Alternatively, the deceleration valves 150, 152 may include a variable orifice.

When a control signal A3, A4 is not applied, the second directional control valves 140, 142 may be in a first position 140A, 142A, and the compressed air may be exhausted at a first speed through the second directional control valve 140, 142. When the control signal A3, A4 is applied to the second directional opening/closing valve 110, the second directional control valves 140, 142 may be switched to a second position 140B, 142B, and the compressed air may be exhausted at a second speed less than the first speed through the second directional control valves 140, 142.

As illustrated in FIG. 3, a controller 20 may be electrically connected to the emergency stop selection portion 50, the operation initiation selection portion 60 and the door detection sensor 44A, 44B to receive signals therefrom, and may output control signals A1, A2, B2 A3, A4 to the opening/ closing valve 110, the first directional control valve 120 and the second directional control valves 140, 142. For example, the controller 20 may output electrical control signals A1, A2, B2, A3, A4 for opening the door 30 according to a workpiece machining program (CNC program).

The emergency stop selection portion 50 may include a push button which an operator presses at emergency. When the operator presses the push button, an emergency stop signal E may be generated to be outputted to the controller 200. Alternatively, the emergency stop selection portion 50 may output the emergency stop signal generated by control logic to the controller 200.

The operation initiating selection portion 60 may include a push button which generates an operation signal R for restarting the operation of the door 30 after the emergency stop signal. When the operation initiating selection portion 60 is selected, the operation signal R for restarting may be outputted to the controller 200.

The door detection sensor 44A, 44B may include limit switches installed in the cover body 20 to detect whether or not the door 30 is opened, proximity sensors installed in the door cylinder 40, etc. For example, the first door detection sensor 44A may detect a completely closed state of the door 30 and the detected signal S1 may be outputted to the controller 200. The second detection sensor 44B may detect a completely open state of the door 30 and the detected signal S2 may be outputted to the controller 200.

Hereinafter, a method of controlling a door using the pneumatic control device in FIG. 2 will be explained.

Figure 4:
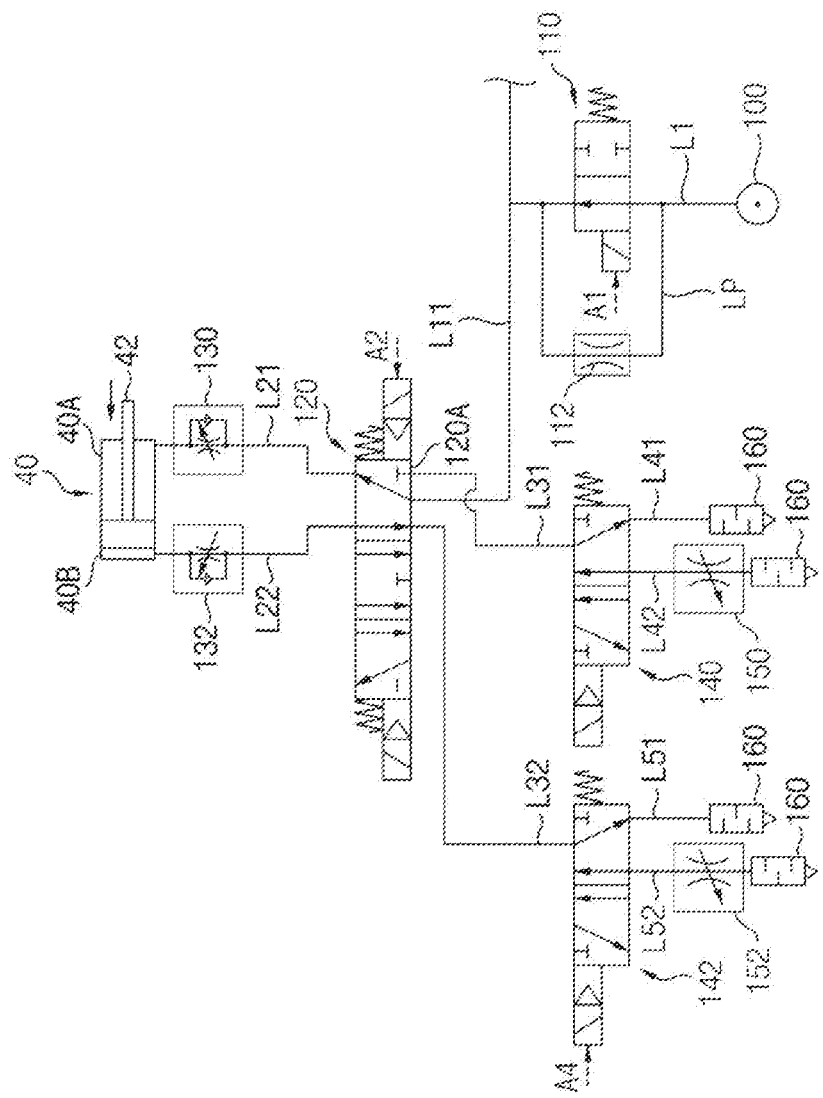
FIG. 4 is a pneumatic circuit diagram illustrating a step of opening the door in the pneumatic control device of FIG. 2.
Figure 5:
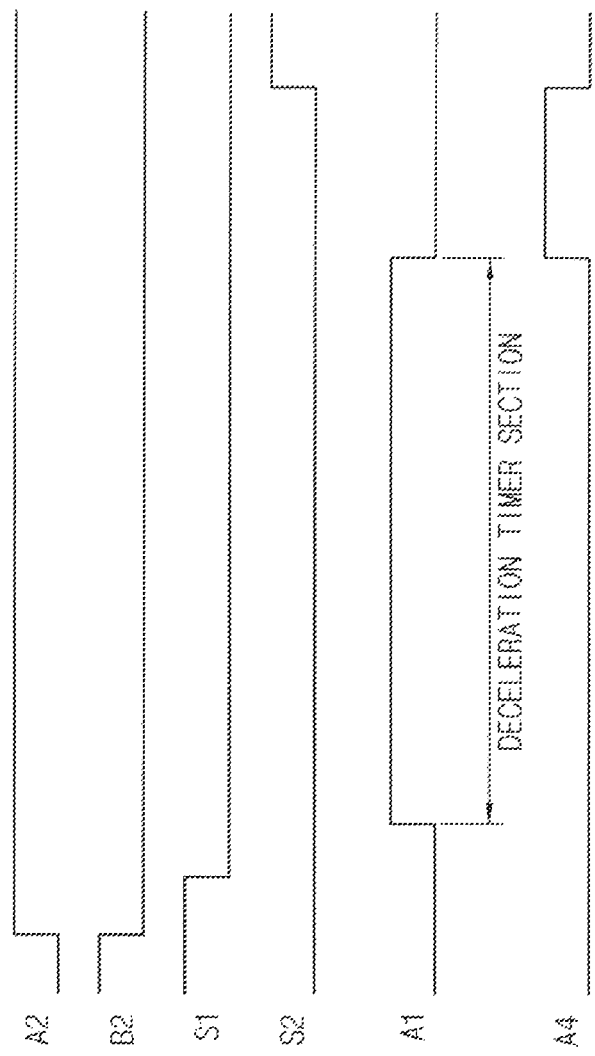
FIG. 5 is graphs illustrating signals inputted/outputted to/from the controller in the step of FIG. 4.

FIG. 4 is a pneumatic circuit diagram illustrating a step of opening the door in the pneumatic control device of FIG. 2. FIG. 5 is graphs illustrating signals inputted/outputted to/from the controller in the step of FIG. 4.

Referring to FIGS. 3, 4 and 5, the controller 200 may output the door opening control signal A2 to the first directional control valve 120 and output the ON/OFF control signal A1 to the opening/closing valve 110 for opening the door 30.

Thus, the first directional control valve 120 may be switched to the first position (door open position) and the opening/closing valve 110 may be switched to the open position. The compressed air from the pneumatic source 100 may be supplied to the rod side chamber 40A of the door cylinder 40 through the rod side line L21 via the opening/closing valve 110 and the first directional control valve 120, so that the operation rod 42 may move back and the door 30 may be opened. The compressed air within the head side chamber 40B may be exhausted through the head side line L22 via the first directional control valve 120 and the second control valve 142. In particular, the compressed air passing through the second exhaust line L32 connected to the second outlet port TB of the first directional control valve 120 may be exhausted to the surrounding atmosphere through the first line L51 connected to the first working port A of the second directional control valve 142.

In here, the controller 200 may count a door opening operation time, and may output the control signal for reducing the exhaust speed of the compressed air by lapse of a predetermined time (deceleration timer section) after outputting the door opening control signal A2.

In particular, the controller 200 may stop output of the ON/OFF control signal A1 at time close to end point of the door opening operation and may output the control signal A4 to the second directional control valve 142. Thus, the opening/closing valve 110 may be switched to the closed position, and the second directional control valve 142 may be switched to the second position.

Accordingly, because the compressed air from the pneumatic source 110 is supplied through the bypass line LP via the orifice, the amount (speed) of the compressed air supplied to the door cylinder 40 may be reduced. Further, because the compressed air exhausted through the second directional control valve 142 is exhausted via the deceleration valve 152 installed in the second line L52, the amount (speed) of the exhausted compressed air may be reduced. Thus, the speed of the door 30 at the end point of the door opening operation may be reduced to thereby prevent impact due to opening of the door 30 and resultant noises.

Figure 6:
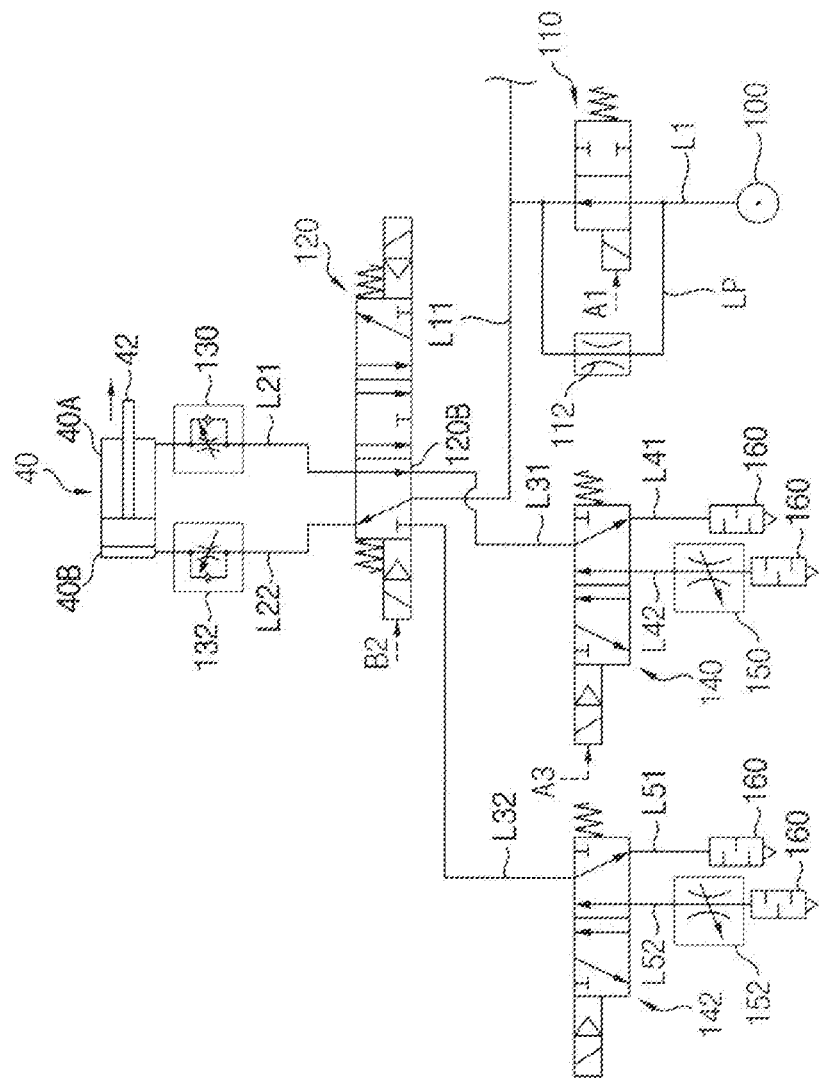
FIG. 6 is a pneumatic circuit diagram illustrating a step of closing the door in the pneumatic control device of FIG. 2.
Figure 7:
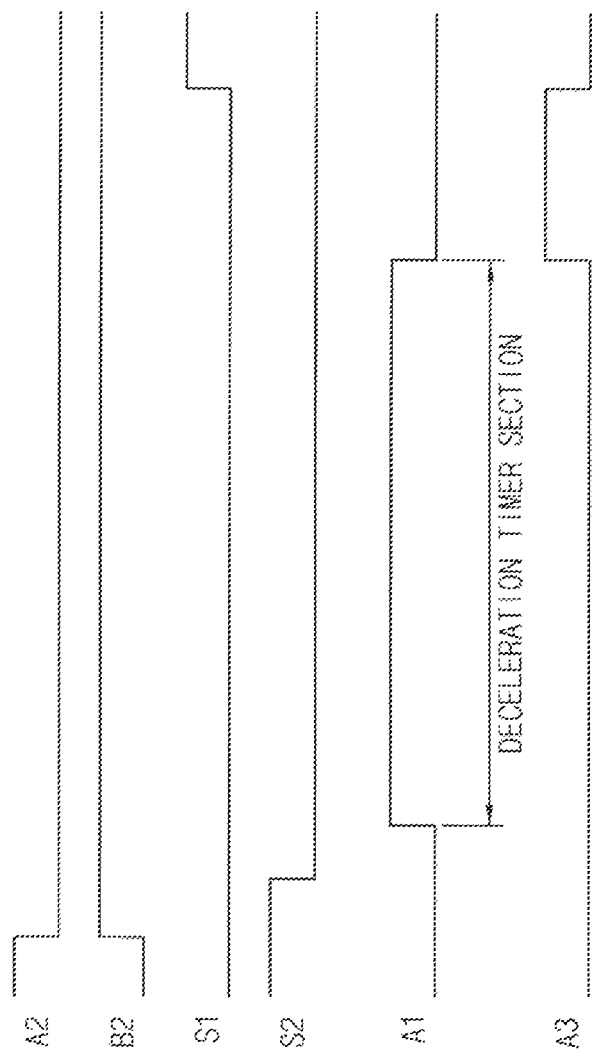
FIG. 7 is graphs illustrating signals inputted/outputted to/from the controller in the step of FIG. 6.

FIG. 6 is a pneumatic circuit diagram illustrating a step of closing the door in the pneumatic control device of FIG. 2. FIG. 7 is graphs illustrating signals inputted/outputted to/from the controller in the step of FIG. 6.

Referring to FIGS. 3, 6 and 7, the controller 200 may output the door closing control signal B2 to the first directional control valve 120 and output the ON/OFF control signal A1 to the opening/closing valve 110 for closing the door 30.

Thus, the first directional control valve 120 may be switched to the second position (door closed position) and the opening/closing valve 110 may be switched to the open position. The compressed air from the pneumatic source 100 may be supplied to the head side chamber 40B of the door cylinder 40 through the head side line L22 via the opening/closing valve 110 and the first directional control valve 120, so that the operation rod 42 may move forth and the door 30 may be closed. The compressed air within the rod side chamber 40A may be exhausted through the rod side line L21 via the first directional control valve 120 and the second control valve 140. In particular, the compressed air passing through the first exhaust line L31 connected to the first outlet port TA of the first directional control valve 120 may be exhausted to the surrounding atmosphere through the first line L41 connected to the first working port A of the second directional control valve 140.

In here, the controller 200 may count a door closing operation time, and may output the control signal for reducing the exhaust speed of the compressed air by lapse of a predetermined time (deceleration timer section) after outputting the door closing control signal B2.

In particular, the controller 200 may stop output of the ON/OFF control signal A1 at time close to end point of the door closing operation and may output the control signal A3 to the second directional control valve 140. Thus, the opening/closing valve 110 may be switched to the closed position, and the second directional control valve 140 may be switched to the second position.

Accordingly, because the compressed air from the pneumatic source 110 is supplied through the bypass line LP via the orifice, the amount (speed) of the compressed air supplied to the door cylinder 40 may be reduced. Further, because the compressed air exhausted through the second directional control valve 140 is exhausted via the deceleration valve 150 installed in the second line L42, the amount (speed) of the exhausted compressed air may be reduced. Thus, the speed of the door 30 at the end point of the door closing operation may be reduced to thereby prevent impact due to closing of the door 30 and resultant noises.

Figure 8:
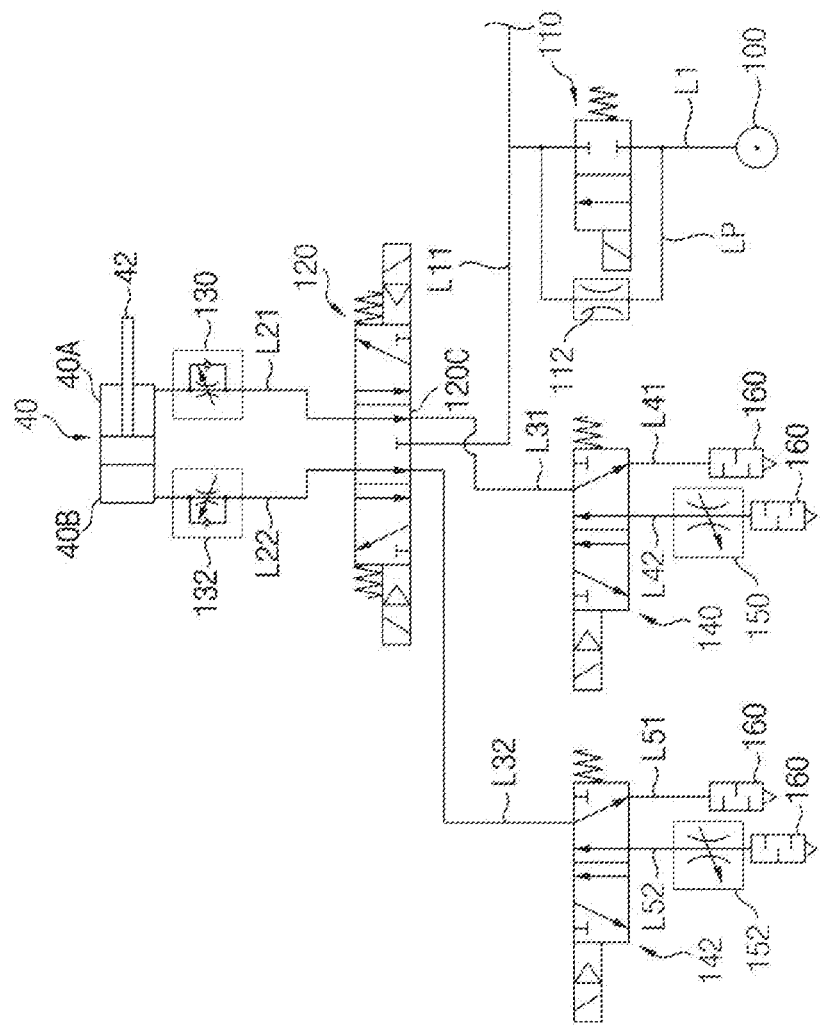
FIG. 8 is a pneumatic circuit diagram illustrating a step of an emergency stop operation in the pneumatic control device of FIG. 2.
Figure 9:
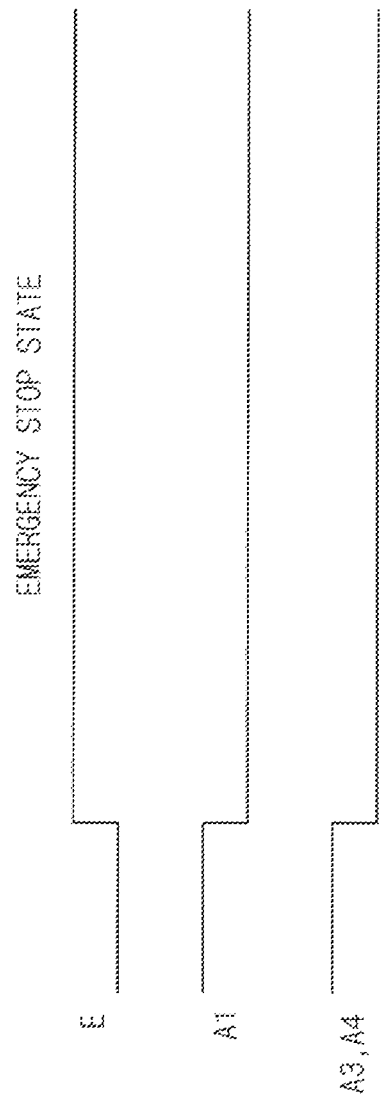
FIG. 9 is graphs illustrating signals inputted/outputted to/from the controller in the step of FIG. 8.

FIG. 8 is a pneumatic circuit diagram illustrating a step of an emergency stop operation in the pneumatic control device of FIG. 2. FIG. 9 is graphs illustrating signals inputted/outputted to/from the controller in the step of FIG. 8.

Referring to FIGS. 3, 8 and 9, the controller 200 may receive the emergency stop signal E, stop output of the door opening/closing control signals A2, B2 and stop output of the ON/OFF control signal A1 for stop the operation of the door 30.

Thus, the first directional control valve 120 may be switched to the third position (door neutral position) and the opening/closing valve 110 may be switched to the closed position. The supply of compressed air from the pneumatic source 100 may be stopped, the compressed air within the rod side chamber 40A may be exhausted through the rod side line L21 via the first directional control valve 120 and the second control valve 140, and the compressed air within the head side chamber 40B may be exhausted through the head side line L22 via the first directional control valve 120 and the second control valve 142. In particular, the compressed air passing through the first exhaust line L31 connected to the first outlet port TA of the first directional control valve 120 may be exhausted to the surrounding atmosphere through the first line L41 connected to the first working port A of the second directional control valve 140, and the compressed air passing through the second exhaust line L32 connected to the second outlet port TB of the first directional control valve 120 may be exhausted to the surrounding atmosphere through the first line L51 connected to the first working port A of the second directional control valve 142.

Thus, the compressed air within the rod side chamber 40A and the head side chamber 40B of the door cylinder 40 may be exhausted rapidly through the first directional control valve 120 and the second directional control valves 140, 142 to thereby rapidly stop the operation of the door 30.

Figure 10:
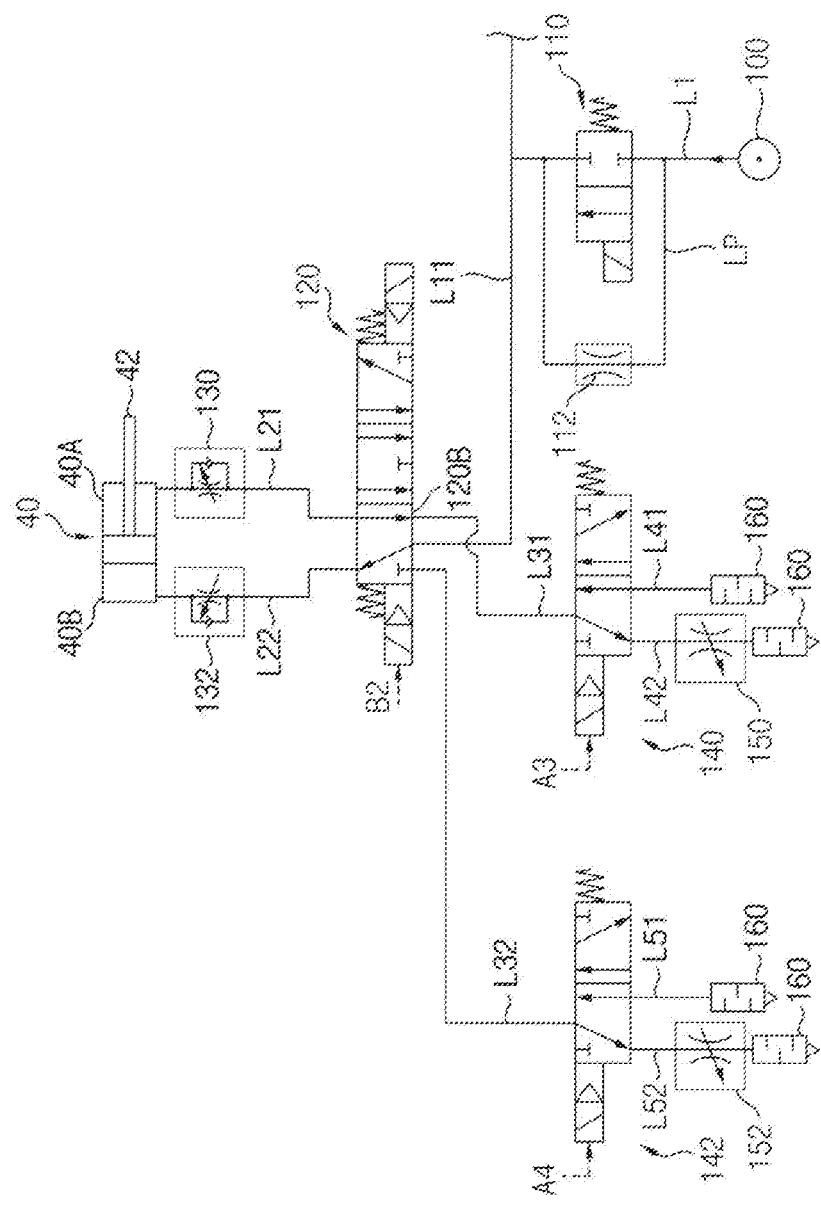
FIG. 10 is a pneumatic circuit diagram illustrating a step of restarting the operation of the door after the emergency stop operation in the pneumatic control device of FIG. 2.
Figure 11:
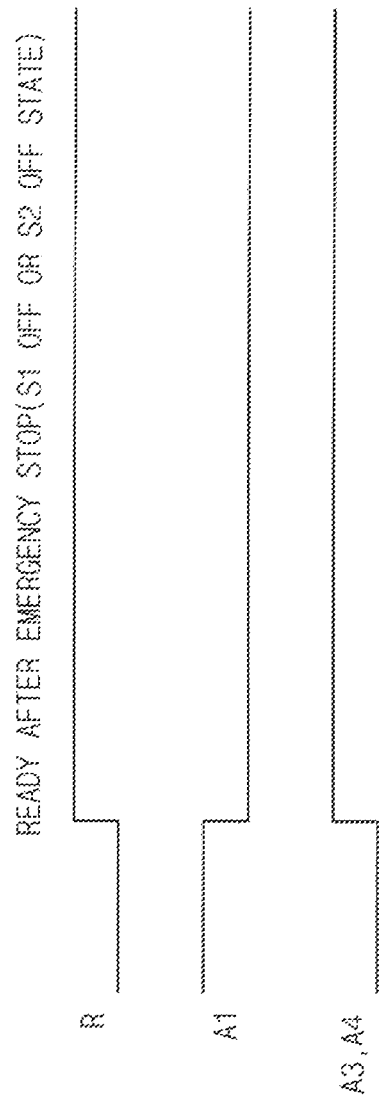
FIG. 11 is graphs illustrating signals inputted/outputted to/from the controller in the step of FIG. 10.

FIG. 10 is a pneumatic circuit diagram illustrating a step of restarting the operation of the door after the emergency stop operation in the pneumatic control device of FIG. 2. FIG. 11 is graphs illustrating signals inputted/outputted to/from the controller in the step of FIG. 10.

Referring to FIGS. 3, 10 and 11, the controller 200 may receive the operation signal R for restarting the operation of the door 30 after the emergency stop signal E, and, at the beginning, stop output of the ON/OFF control signal A1 and output the control signal A3, A4 to the second directional control valves 140, 142 for restarting the operation of the door 30. In here, in case that the door 30 is not completely open or closed, the controller 200 may not receive the door opening/closing control signals S1, S2 from the first and second door detection sensors 44A, 44B. Additionally, the controller 200 may output the door control signal A2, B2 to the first directional control valve 120 for switching the first directional control valve 120 to the switched position before the emergency stop signal E.

For example, in case the emergency stop signal E is generated in the step of closing the door, the first directional control valve 120 may be switched to the second position (door closed position) according to the operation signal R. Additionally, the opening/closing valve 110 may be switched to the closed position, and the second directional control valves 140, 142 may be switched to the second position respectively.

Accordingly, because the compressed air from the pneumatic source 110 is supplied through the bypass line LP via the orifice, the amount (speed) of the compressed air supplied to the door cylinder 40 may be reduced. Further, because the compressed air exhausted through the second directional control valve 140 is exhausted via the deceleration valve 150 installed in the second line L42, the amount (speed) of the exhausted compressed air may be reduced. Thus, when a system is restarted after the emergency stop, sudden acceleration of the door 30 may be prevented.

Figure 12:
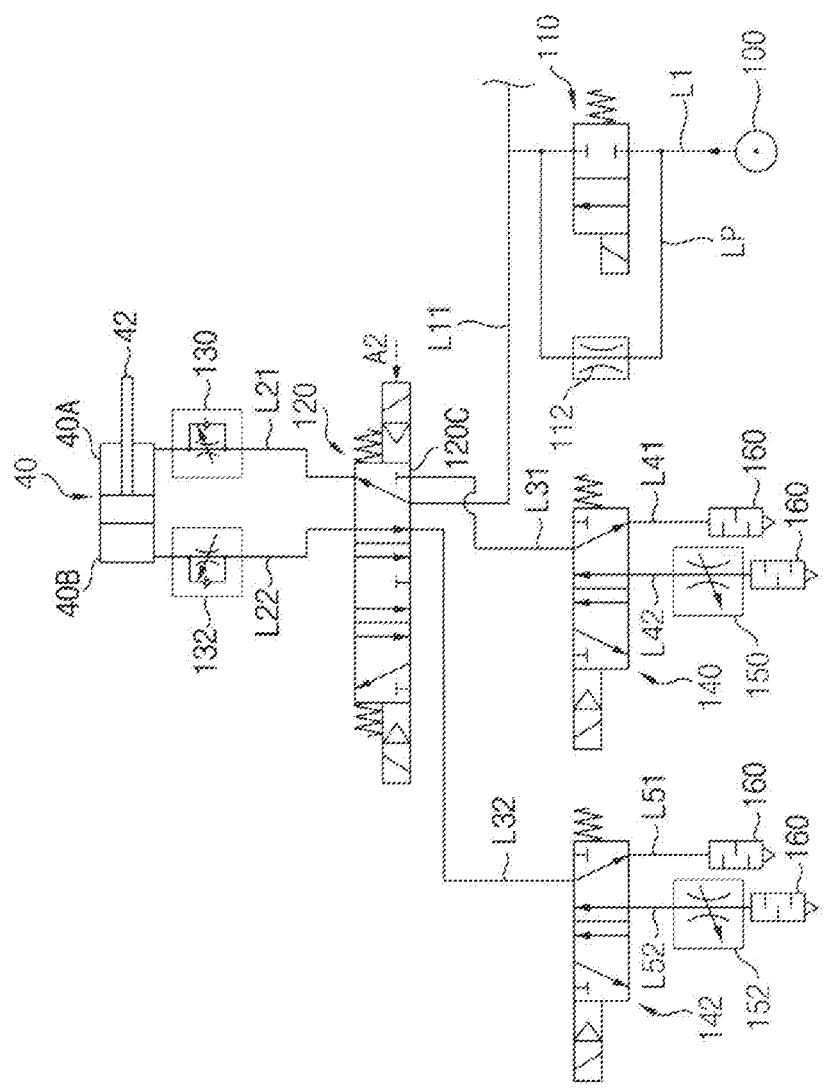
FIG. 12 is a pneumatic circuit diagram illustrating a control method in case that the door is completely open or closed when restarting the operation of the door after the emergency stop operation in the pneumatic control device of FIG. 2.

FIG. 12 is a pneumatic circuit diagram illustrating a control method in case that the door is completely open or closed when restarting the operation of the door after the emergency stop operation in the pneumatic control device of FIG. 2. FIG. 13 is graphs illustrating signals inputted/outputted to/from the controller in the step of FIG. 12.

Referring to FIGS. 3, 12 and 13, the controller 200 may receive the operation signal R for restarting the operation of the door 30 after the emergency stop signal E, and, at the beginning, stop output of the ON/OFF control signal A1 for restarting the operation of the door 30. In here, in case that the door 30 is completely open or closed, the controller 200 may receive the door opening/closing control signals S1, S2 from the first and second door detection sensors 44A, 44B, and may not output the control signal A3, A4 to the second directional control valves 140, 142. Additionally, the controller 200 may output the door control signal A2, B2 to the first directional control valve 120 for switching the first directional control valve 120 to the switched position before the emergency stop signal E.

For example, in case the emergency stop signal E is generated in the step of opening the door, the first directional control valve 120 may be switched to the first position (door open position) according to the operation signal R. Additionally, the opening/closing valve 110 may be switched to the closed position. But, because the door 30 is completely closed, the second directional control valves 140, 142 may not be switched to the second position and may be maintained the first position. Accordingly, the exhaust speed of the compressed air exhausted from the second directional control valves 140, 142 may be maintained at a relatively rapid speed.

As mentioned above, the compressed air within the door cylinder 40 may be exhausted through the second directional valves 140, 142 according to the emergency stop signal E, when the operation signal E is generated after the emergency stop signal, in case that the door 30 is not completely closed, the second directional control valve 140, 142 may be switched to reduce the exhaust speed of the compressed air. Accordingly, when the system is restarted after the emergency stop, the sudden acceleration of the door 30 may be prevented.

The present invention has been explained with reference to preferable embodiments, however, those skilled in the art may understand that the present invention may be modified or changed without being deviated from the concept and the scope of the present invention disclosed in the following claims.

THE DESCRIPTION OF THE REFERENCE NUMERALS

10: machine tool 20: cover body
30: door 40: door cylinder
40A: rod side chamber 40B: head side chamber
42: operation rod 44A, 44B: door detection sensor
50: emergency stop selection portion 60: operation initiating selection portion
100: pneumatic source 110: opening/closing valve
120: first directional control valve 130, 132: flow control valve
140, 142: second directional control valve 150, 152: deceleration valve
200: controller

The invention claimed is:

1. A pneumatic control device of auto door, comprising:
a first directional control valve configured to control a direction of a compressed air supplied to a door cylinder for opening and closing a door;
a door detection sensor configured to detect an open/close state of the door;
first and second exhaust lines respectively connected to first and second outlet ports of the first directional control valve; and
second directional control valves installed in the first and second exhaust lines respectively to operably exhaust the compressed air exhausted from the first and second outlet ports according to an emergency stop signal, and capable of changing positions to reduce an exhaust speed of the compressed air in case that the door is not completely open or closed when an operation signal is generated after the emergency stop signal.

2. The pneumatic control device of auto door of claim 1, further comprising:
first and second lines respectively connected to first and second working ports of the second directional control valve; and
a deceleration valve installed in any one of the first and second lines.

3. The pneumatic control device of auto door of claim 2, wherein the deceleration valve includes a variable orifice.

4. The pneumatic control device of auto door of claim 1, wherein each of the second directional control valves is operable to maintain the exhaust speed of the compressed air in case that the door is completely open or closed when the operation signal is generated after the emergency stop signal.

5. The pneumatic control device of auto door of claim 1, further comprising:
an emergency stop selection portion for generating an emergency stop signal;
an operation initiating selection portion for generating an operation signal which restarts an operation of the door after the emergency stop signal; and
a controller receiving signals from the emergency stop selection portion, the operation initiating selection portion and the door detection sensor and outputting control signals to the first directional control valve and the second direction control valves.

6. The pneumatic control device of auto door of claim 5, wherein when the controller receives the emergency stop signal, the controller controls that the first directional control valve is switched to be a neutral position.

7. The pneumatic control device of auto door of claim 6, wherein when the controller receives the operation signal, the controller outputs the control signal before the emergency stop signal to the first directional control valve.

8. The pneumatic control device of auto door of claim 6, wherein the controller outputs the control signal for reducing the exhaust speed of the compressed air to the second directional control valve by lapse of a predetermined time after outputting the control signal for opening and closing the door to the first directional control valve.

9. The pneumatic control device of auto door of claim 1, further comprising:
an opening/closing valve installed in a supply line which connects a pneumatic source and the first directional control valve to open and close the supply line.

10. The pneumatic control device of auto door of claim 6, further comprising an orifice installed valve in a bypass line which bypasses the opening/closing valve.

11. The pneumatic control device of auto door of claim 1, wherein the first and second directional control valves include a pilot operated solenoid control valve.

12. The pneumatic control device of auto door of claim 1, wherein the first directional control valve includes 5 port 3 position direction control valve.

13. A pneumatic control method of auto door, comprising:
installing second directional control valves respectively in first and second exhaust lines respectively connected to first and second outlet ports of a first directional control valve;
supplying a compressed air to a door cylinder through the first directional control valve;
detecting an open/close state of the door;
exhausting the compressed air from the first and second outlet ports through the second directional control valves according to an emergency stop signal; and
switching the second directional control valve to reduce an exhaust speed of the compressed air in case that the door is not completely open or closed when an operation signal is generated after the emergency stop signal.

14. The pneumatic control method of auto door of claim 13, further comprising:
making no changes in positions of the second directional control valve to maintain the exhaust speed of the compressed air in case that the door is completely open or closed when the operation signal is generated after the emergency stop signal.

15. The pneumatic control method of auto door of claim 13, further comprising:
switching the first directional control valve to a switched position before the emergency stop signal.

* * * * *